United States Patent [19]

Schreib et al.

[11] Patent Number: 4,712,512
[45] Date of Patent: Dec. 15, 1987

[54] BIRD FEEDER MADE FROM A PLASTIC BOTTLE, INCLUDING APPARATUS THEREFOR AND A METHOD OF MAKING

[76] Inventors: Bernhard Schreib, 2465 S. 170th St., New Berlin, Wis. 53151; John K. Schreib, W299S4807 Hwy. 83, Mukwonago, Wis. 53149

[21] Appl. No.: 891,657

[22] Filed: Aug. 1, 1986

[51] Int. Cl.$^4$ .............................................. A01K 39/01
[52] U.S. Cl. .................... 119/52 R; 119/51 R
[58] Field of Search .................... 119/51 R, 52 R

[56] References Cited

U.S. PATENT DOCUMENTS

| | | | |
|---|---|---|---|
| 3,089,462 | 5/1963 | Brockmann | 119/52 R |
| 4,259,927 | 4/1981 | Clarke | 119/51 R |
| 4,327,669 | 5/1982 | Blasbalg | 119/51 R |
| 4,570,575 | 2/1986 | Hinz | 119/51 R X |

FOREIGN PATENT DOCUMENTS 2146221  4/1985  United Kingdom ............. 119/51 R

Primary Examiner—Robert P. Swiatek
Attorney, Agent, or Firm—Lee, Smith & Zickert

[57] ABSTRACT

A method and apparatus components for converting a plastic carbonated beverage bottle into a bird feeder. The apparatus components include pointed feeder trays for insertion into the bottle through specially formed slots cut in the sidewall of the bottle, and a decorative sleeve with corresponding cut-outs is secured around the bottle sidewall. An umbrella-like cover made from a flat piece of flexible plastic is clamped atop the bottle by the bottle closure cap of the bottle to protect the seed from rain and to prevent squirrels and the like from taking the bird seed. A piercing-and-cutting tool is provided to pierce the bottle sidewall and sleeve to create the slots for the insertion of the feeder trays and is also useful for making an opening in the bottle cap for the receipt of a support line. A reinforcing cap washer is nested interiorly of the bottle closure cap for added strength and attachment with the support line. A support hook is provided for connection to the support line and for the support of the bird feeder made by the apparatus and method steps.

27 Claims, 9 Drawing Figures

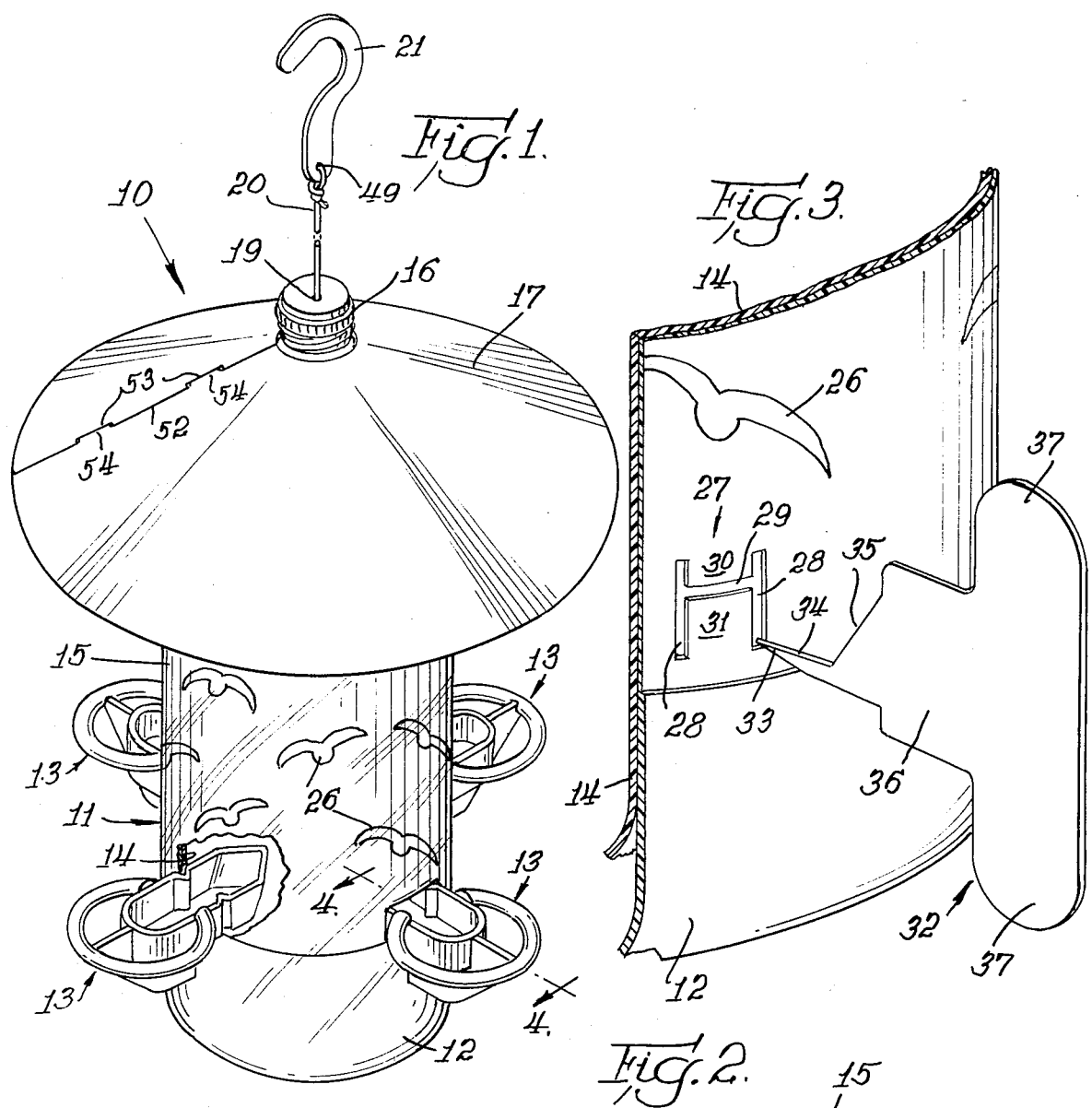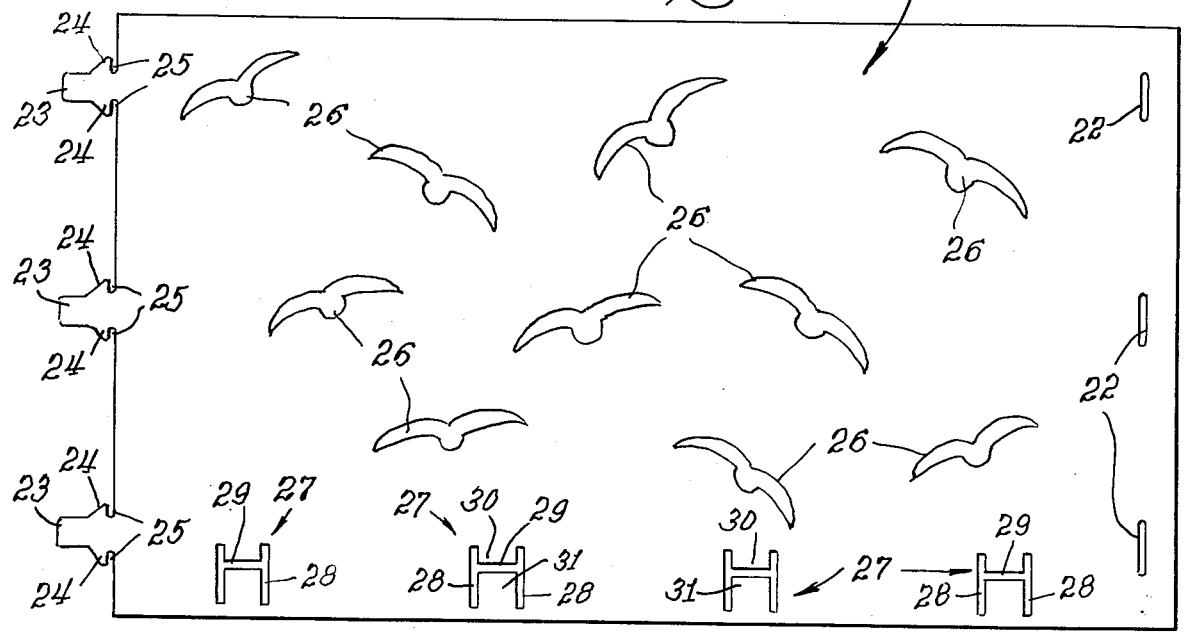

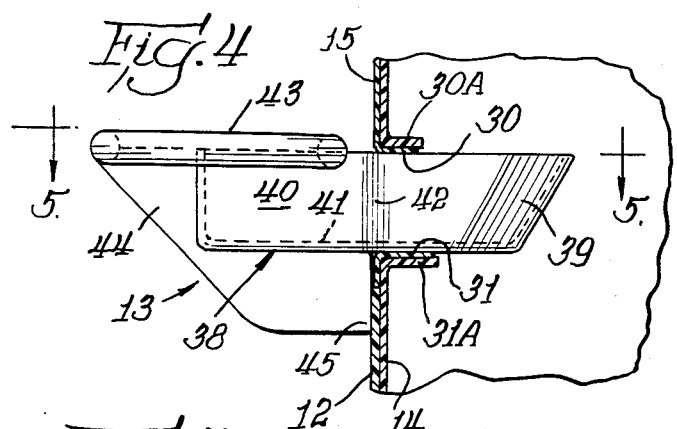
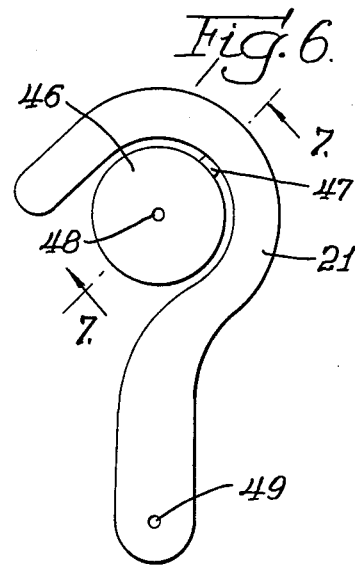
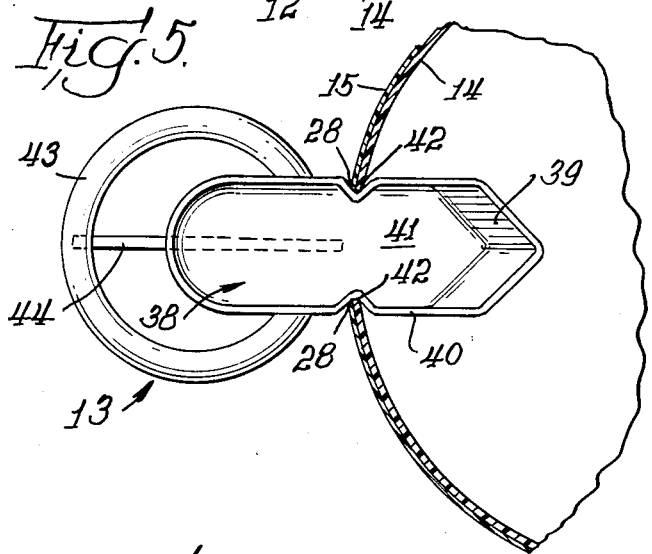
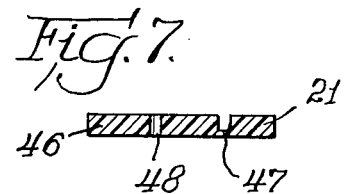
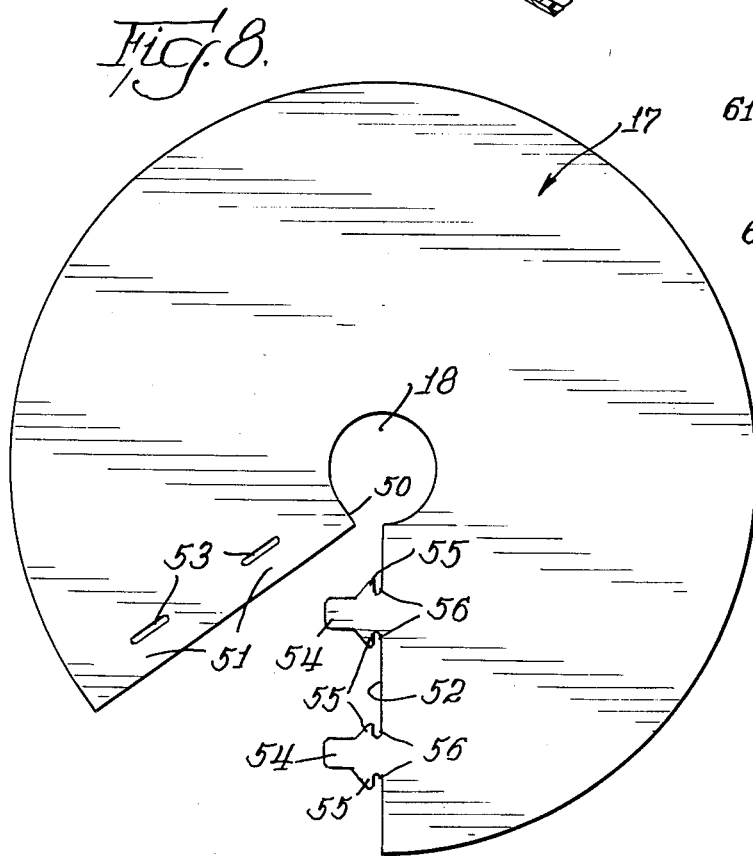
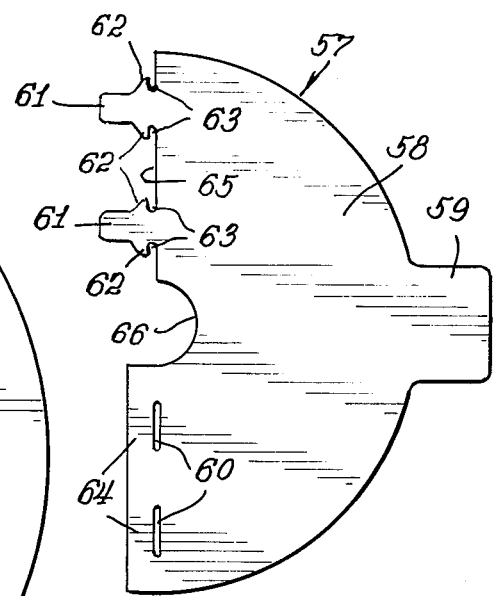
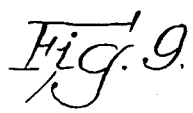

BIRD FEEDER MADE FROM A PLASTIC BOTTLE, INCLUDING APPARATUS THEREFOR AND A METHOD OF MAKING

BACKGROUND AND SUMMARY OF THE INVENTION

The present invention is directed toward converting a plastic bottle, such as a carbonated soft drink container, into bird feeder by the combination of certain apparatus and components therewith in a method for modifying the bottle. The invention is more specifically directed for use with two-liter soft-drink bottles wherein the method incorporates the use of components for affixation and modification to a bottle whereby to provide a combination of these components with the plastic bottle that creates a very useful and enjoyable bird feeder.

Plastic bottles are commonly employed for a variety of liquid refreshments and are particularly well represented in the carbonated soft drink aisles of a supermarket. A popular size is a two-liter plastic bottle that is usually clear with a separate, opaque, thicker base portion that is attached at the bottom of the bottle. Bottles of this widely known design are usually made by stretch blow molding. The affixed base portion serves as pedestal, or support stand, at the curved bottom of the bottle and is generally cup-shaped to extend upwardly along a portion of the sidewall of the clear plastic container. The clear portion of the bottle also usually includes various labels and markings by the manufacturers, showing trademarks, logos, contents, designs, and the like.

Almost always, the upper neck portion of the bottle is thread-engaged by a threaded metal closure cap which is sealed at the bottling plant to maintain the carbonation until opened by the consumer.

Rather than discard these sturdy bottles once the contents are consumed, it is the primary purpose of this invention to provide components, and a method, for modifying such a plastic bottle whereby the components combine with the plastic bottle, to create a very useful and pleasing bird feeder which will last for an essentially indefinite period out-of-doors for attracting and feeding birds without much expense or a great deal of effort required by the consumer and his family.

It is the further goal of the invention to provide a set of kit components which permit the consumer to modify plastic bottles by an easily followed set of steps, which components combine with the plastic bottle to provide a bird feeder that may be hung from a tree branch, porch, balcony, or the like.

It is the further goal of the invention to provide apparatus components and a tool to be used in a method of modifying a plastic bottle, in which the components may be formed in various sizes for use not only with two-liter plastic bottles, but smaller or larger, or differently shaped plastic containers.

It is a also an object of the invention to provide a method of modifying a plastic bottle by the utilization of certain apparatus and components in which trademark or design indicia around the exterior of the bottle may be decoratively concealed by a sleeve-like covering having a coloful and esthetically pleasing appearance.

It is additionally an objective of the invention to provide such a decorative sleeve that includes markings thereon whereby to act as a template for the proper location of particularly shaped cut-outs for the disposition thereat of bird feeder trays to be filled by birdseed contained inside the plastic bottle.

It is further an objective of the invention to provide means for supporting a plastic bottle from the cap thereof, whereby in combination with the other elements, the resulting bird feeder may be supported by a string, cord, or chain, from a tree, or the like. It is moreover a goal of the invention to provide a cover means for preventing squirrels and the like from easily taking bird seed from the feeder. Additionally, it is an allied goal of the invention to provide a funnel component for utilization at the neck opening of the plastic bottle whereby the bird feeder may be easily replenished with bird seed.

It is a concomitent objective to provide a plurality of feeder trays, or dishes, which are insertable through cut-outs in the side of the bottle and also through correspondingly located cut-outs in a decorative sleeve means in one embodiment of the invention.

Accordingly, there is a further objective of the invention to provide a piercing-and-slitting tool means whereby to create particularly shaped cut-outs and flaps in the sidewall of a plastic bottle that cooperate with the bird feeder trays so that the bird feeder trays may be inserted into the sidewall and securely held by the cut-outs and flaps.

It is further an objective of the invention to provide a cap washer means for insertion interiorly of the bottle closure cap, which is cooperative with one end of a supporting string or line means for the support of the feeder device by means of a hook or the like attached at the other end of the supporting line means.

It is further an objective of the invention to provide a cover, decorative sleeve, and funnel means, all which may be manufactured in a pre-assembled flat arrangement and then bent and folded into an assembled configuration for combination with the plastic bottle by means of tab-and-slot engagements whereby the apparatus for practice of the method may be placed into flat compact packaging for sale to the consumer and thereafter folded, bent, and tab/slot secured, to achieve the specific shape and form to be used for the conversion of a plastic bottle into a bird feeder.

It is a further an objective of the invention to provide a piercing-and-slitting tool that will allow for the formation of particularly shaped H-slots that serve to overlie portions of the feeder trays insertable therethrough in order to support the tray at the bottle sidewall. Additionally, it is a goal to provide indents at lateral edges of the feeder trays to accommodate vertical edges of the cut-out slots which thereby engagingly cooperate so that the feeder trays are wedgingly and laterally supported the by vertical edges formed along the edgs of the cut-out slots of the bottle sidewall.

The invention may be first summarized as providing a method for modifying a conventional plastic bottle, preferably of the kind containing a carbonated beverage, to provide a bird feeder device for the backyard, porch, patio, etc. The method for modifying the plastic bottle may involve a step of covering the bottle with a flexible sleeve-like sheet that extends from near the neck of the bottle downwardly therearound to the bottom base, or stand portion, and fastening the sleeve-like member thereby to be decoratively arranged around the exterior of the bottle.

The method further includes piercing the wall of the plastic bottle by use of a piercing-and-slitting tool whereby to form a plurality of generally H-shaped cut-out slots. The sleeve-like, decorative member, if it is to be located to cover around the sidewall along the H-shaped sidewall cut-outs, will necessarily be required to have corresponding H-shaped cut-outs for insertion of feeder trays therethrough. The sleeve-like member may then optionally be pre-marked, or pre-cut, to thereby serve as a template guide for cutting the sidewall when placed therearound. The method further includes the step of inserting a plurality of feeder tray members through the pierced H-slots whereby an upper flap and lower flap of the H-slot serve to hold the feeder tray members to keep them from pivoting upwardly or downwardly.

The steps further include removing the threaded closure cap from the bottle and inserting therein a cap washer means. The cap washer means includes a central opening and the piercing device may be used to centrally cut a positionally corresponding hole in the bottle closure cap. Thereafter, a string, cord, or line, means may be knotted at the bottom and inserted through the cap washer means and closure cap holes for engagement above with a support hook, for example, or the simple direct attachment to a tree limb, porch, etc.

In order to deter squirrels, cats and the like from stealing food from the bird feeder, the method further includes arranging a cover that is preferably an umbrella-like flexible plastic sheet bendable into a form having an open top for receipt therethrough of the bottle neck and to cover over the bottle from around the bottle neck in an umbrella-like, or canopy-like, arrangement, which additionally protects the feeder trays from becoming soaked by rain water as might occur without the cover apparatus in place. Lastly, the method includes, of course, filling the plastic bottle with bird feed and thereafter securing the cap closure around the threaded bottle neck so that the plastic bottle bird feeder is ready to be hung in the appropriate spot in a backyard, porch, etc.

The invention further may be summarized as a bird feeder formed from a plastic bottle and having a plurality of feeder tray devices wedgingly inserted through special slots cut through the bottle sidewall. The bird feeder also has a decorative sleeve member extending around the bottle sidewall generally from the tapering upper part of the sidewall adjacent the bottle neck, down along the vertical part of the sidewall to meet the upper base-like, support member upon which the bottle rests. The bird feeder further includes a washer-support, or cap washer means interiorly of the closure cap. Thereby the closure cap may be thread-engaged to the bottle neck and the bird feeder supported by a line means extending through the bottle cap for affixation to the cap washer means whereby to be sturdily supportable thereabove at the other end by a hook, or the like. The decorative sleeve member may additionally include ornamental cut-outs or, for example, translucent design portions, whereby the volume of the bird seed in the bottle may be visually monitored for re-filling when necessary.

The invention can further be summarized as a combination of apparatus components, for a conversion kit, used in the modification of a plastic bottle into a bird feeder. The apparatus including a piercing-and-slitting device for cutting the sidewall of the bottle and piercing the bottle closure cap for the receipt therethrough of a supporting line means; and, covering means and decorative sleeve means each bendable from flattened sheets of flexible plastic for attachment to the bottle. A plurality of bird feeder trays are cooperative with the specially-shaped slots cut through the bottle sidewall, as made by means of the piercing-and-slitting tool, which are wedgingly insertable into the cut slots to be supported thereat by the bottle sidewall. A portion of the feeder trays extend interiorly of the bottle to receive the flow of bird seed from inside the bottle to then flow outwardly of the bottle so that birds may be granted access to the bird seed. The feeder trays are securely held at the slots and include a lower support flange means, to make the trays further capable of supporting the weight of the birds during feeding. The kit components further include a cap washer means and support hook means that are cooperative with a string, cord, or line, means for the support of the converted plastic bottle feeder from a porch, balcony, tree limb, and the like.

BRIEF DESCRIPTION OF THE DRAWINGS

FIG. 1 is a perspective view of the bird feeder device made in accordance with the invention in which a plastic, two-liter bottle has been modified in conjunction with the further combination of certain apparatus.

FIG. 2 is a flattened, decorative flexible plastic sheet shown prior to being curled, bent, and secured into a cylindrical sleeve-like shape for placement around the exterior of a bottle sidewall;

FIG. 3 shows a tool in the process of piercing and cutting the bottle sidewall to form specially shaped cut-out slots that supportively accommodate feeder trays inserted therethrough as shown in FIG. 1 and further showing a bottom base member affixed at the bottom round end of the plastic bottle sidewall;

FIG. 4 is a vertical sectional view taken along line 4—4 of FIG. 1, looking in the direction of the arrows, and showing the supportive interaction between the sidewall of the plastic bottle and one of the feeder trays;

FIG. 5 is a horizontal sectional view of the feeder tray shown in FIG. 4 taken along 5—5 looking in the direction of the arrows;

FIG. 6 is a plan view of an integrally molded support hook and cap washer means cooperative with the closure cap for the support of the bird feeder device as shown in FIG. 1;

FIG. 7 is a sectional view of the support hook and cap washer means shown in FIG. 8 taken along line 7—7 looking in the direction of the arrows and showing a thin break-away sprue-like connector therebetween formed during the integrally molding thereof;

FIG. 8 is a plan view of a flattened plastic sheet for an umbrella-like cover for the bird feeder, as shown in FIG. 1, prior to the securing connection of the tabs and slots which, when connected, make the sheet assume a generally truncated cone-like shape, with a central opening for disposition over the neck of the plastic bottle; and, FIG. 9 is a flattened plastic sheet shown prior to being bent and prior to having tabs thereat inserted into the cooperative slots as shown, which when connected make the sheet assume a funnel-like shape useful for filling the bird feeder of FIG. 1 through the neck thereof upon removing the bottle closure cap.

DETAILED DESCRIPTION OF THE PREFERRED EMBODIMENT

Like reference numerals are used throughout to identify the same elements of the invention as shown in the 5 appended drawing.

The ultimate result of the unique method for making a bird feeder, and the cooperative combination of apparatus elements with a plastic bottle, is shown in FIG. 1 at a bird feeder 10. The bird feeder 10 is illustrated in a perspective view and ready to be supported outdoors for attracting birds. The bird feeder 10 is comprised of a plastic bottle 11, preferably a two-liter carbonated beverage type bottle, having a lower support base portion 12 which is of the kind that is typically attached by adhesives to the round closed bottom of the sidewall of clear plastic blow-molded bottles during the course of manufacturing these conventional type of beverage containers. A plurality of feeder trays 13 extend into the bottle through bottle sidewall 14, which is covered by a decorative, sleeve-like member 15 that creates an esthetically pleasing appearance. Typically, the base 12 is opaque, usually black plastic, whereby from the base 12 upwardly through the region of the decorative sleeve 15, a pleasing appearance may be obtained while also hiding any bottle markings and the inside of the bottle 11 which would be otherwise viewable at the clear sidewall 14. Bird feed, usually seed, is contained within the bottle 11 and will move downwardly as birds eat from the feeder trays 13, as would be clear. Around the bottom edge of a bottle closure cap 16, which is thread-engageable around the open threaded neck of the bottle, extends umbrella-shaped cover member 17, having a central aperture 18. The cap 16 clamps the cover 17 to the bottle 11 when threaded on the bottle neck. Thereby, the cover member 17 deters squirrels and the like from climbing downward on the bottle 11 and eating the bird seed. Additionally, rain is prevented from directly impinging upon the feeder trays 13, whereby to keep the seed dry and also to provide a protective cover for birds resting on the trays 13.

The closure cap 16 includes an aperture 19 therethrough for receipt of a line means 20, which may be a string, cord, wire, or the like, that extends upwardly to be engaged by a support hook 21 capable of supporting the bird feeder 10 from a tree limb, porch, etc.

With reference now made to FIGS. 2 and 3, it will be noted that the decorative sleeve 15 is a bendable wrap-around thin sheet, preferably made of plastic such as polyethylene, which may be clear or opaque, depending upon the desirable esthetic appearance required. The length of the pre-assembled sheet is substantially equal to the circumference of the bottle sidewall 14 to be able to slide over the bottle and closely hug the sidewall 14 when assembled, as would be understood. The wrap-around feature of sleeve 15 is provided by slots 22 located at one side of the flattened pre-assembled arrangement shown in FIG. 3 for cooperation with insertable tabs 23 having ears 24 extending outwardly therefrom and terminating at narrow notches 25. Thereby, the tabs 23 are inserted through the slots 22 until the ears 24 pass through the thickness of the sheet, whereupon the notches 25 slide into the slots 22 and the sleeve 15 is thus securely connected to be wrapped around the bottle 11 as shown in FIG. 1. Denoted generally at 26 are a plurality of decorative drawings, or figures, which may be cut-outs, such as when the material is opaque, or they may be marked thereon, or they might alternately be decals, as desired. If, for example, sleeve 15 were opaque, then the FIGS. 26 might be cut-out whereby the level of the feed inside of the feeder 10 may be conveniently monitored.

In the preferred embodiment the sleeve 15 also serves as a template whereby it is manufactured such as by being dle cut after extrusion, with a number of H-shaped cut-outs 27 in correspondence to the number of feeder trays 13 required. As shown, four H-shaped cut-outs 27 are provided and each includes parallel vertical cut-out slot portions 28 joined by a horizontal cut-out 29 making the "H" shape and whereby to form a bendable upper tab 30 and a bendable lower tab 31. Upon wrapping the sleeve 15 around the bottle 11 and inserting the tabs 23 into the slots 22, the sleeve 15 is preferably of a size to reside generally above, and resting on, the bottom base 12 with the H-cut-outs 27 spaced equidistantly, or symmetrically, therearound. Then a piercing-and-slitting tool 32, shown in FIG. 3, may be used to make corresponding cut-outs through the bottle wall 14 by following the shape of the H-cut-outs 27 through the vertical slots 28 and horizontal connecting slot 29 to provide corresponding tabs 30A and 31A formed through and with the sidewall 14 as shown in FIG. 4. Thereby, the sleeve 15 provides the template-like function. Of course, the bottle sidewall 14 may be independently pierced and slit to have H-shaped cut-outs in registry with those provided on the sleeve 15. Alternatively, both the sleeve 15 and bottle wall 14 might be slit together wherein a solid uncut sleeve 15 is arranged around the bottle 11 and then marked and cut at the same time with the sidewall 15 in a double layer cutting procedure. It is more desirable, of course, to provide the sleeve 15 with the pre-cut, H-slots 27 for ease and accuracy in cutting the bottle sidewall 14 as shown in the illustrative embodiment. The cutting operation is facilitated by use of a piercing-and-slitting tool 32 by first piercing the sleeve and/or sidewall with a pointed end 33, of a first blade edge 34. Extending at an oblique angle from the blade edge 34 is an inclined blade edge 35 sloping upwardly therefrom to terminate in a generally flat body portion 36. The length and height of edge 35, defined at its intersection with portion 36, are preselected to be sufficient to exactly cut the slots 28 and 29 in the same length, but not longer, as would be clear. Body portion 36 thus acts as a limit stop preventing overcutting. At the opposite sides of body portion 36, a pair of finger tab grips 37 oppositely extend and form a key-like shape whereby to be easily held by the person and manipulated for the piercing procedure. Additionally, it will be noted that the point 33 may be used to cut the center aperture 19 through closure cap 16 for the insertion of the line means 20. The H-shaped cut-outs create the flaps 30, 30A, 31, and 31A which perform as upper and lower resilient securement structures by over and underlying the feeder trays 13, as viewed best in FIGS. 1 and 4. More specifically, the feeder trays 13 are provided with an upwardly open seed-receiving trough 38 that is generally defined by a front tapering, leading wall 39 for easy receipt of the bird seed from above, a pair of side walls 40, and a bottom wall 41, that provide the seed-holding shape for the trough 38. About midway along the sidewalls 40 a pair of vertical lateral indents 42 are provided for supportive nesting of the vertical cut sidewall edges at the H-cut-out slots 28 through the bottle sidewall 14. Thereby, the bottle sidewall 14 also facilitates the wedged insertion of the sidewalls 40 at the notches 42. Stated another way, the distance between the cut-out slots 28 equals the distance between the notches 42, which is less less than the width of the tray 38, so that a tight nested, or wedged, arrangement is achieved. As viewed in FIG. 5, approximately half of the tray volume of each trough 38 is interior of the bottle 11, and the other half extends outwardly therefrom enabling birds to peck at the seed therein. At the outward ends of the tray 13 a ring 43 is formed integrally therewith and extends in a horizontal plane whereby a bird may rest thereon. Extending downwardly from the ring 43 is a flange 44 which extends from the ring 43 and is preferably integrally formed with the bottom of the tray 38, to terminate at a forward leading edge 45 spaced along the bottom wall 41 at a location substantially the same as the indents 42 whereby to be able to abut the sidewall 14 or base 12 of the bottle 11 when the feeder tray 13 is fully inserted with the indents 42 in the wedged engagement with the wall 14. Thereby, it will be seen that unwanted downward pivoting of the trays 13 is prevented by reason of the leading edge 45 being stopped against the bottle 11, such as when a bird rests on the ring 43.

The feeder 13 will thus be understood to be vertically restrained at the sidewall 14 by the flaps 30, 30A resiliently pressing downwardly atop the sidewall 40, and flaps 31 and 31A resiliently pressing upwardly against the bottom wall 41. Horizontal support is provided by the cooperative interaction of the indents 42 wedged against the vertical edges of the cut-outs 27 that pinch thereagainst. Downward pivoting of the feeder trays 13 by the weight of a bird resting upon the ring 43 is prevented by the flange edge 45 abutting against the bottle 11. Additionally, the ring 43 gives the person a grip support for inserting the feeder trays 13 interiorly of the bottle through the sidewall 14 during conversion of the bottle 11 into the bird feeder 10. The feeder trays 13 in the disclosed embodiment are molded G.P. polystyrene and have a trough wall thickness of about 0.040 inches. Also, the locations of the cut-outs 28, as shown in the exemplary embodiment, arrange the bottom wall 41 of the feeder trays 13 to be rested upon the top edge of the cup-shaped support base 12, which provides added vertical support for the trays, as would be clear. This feature of the invention is not required for its practice but is beneficial when extra strength and tray reinforcement is needed or desired.

The sturdy support of the bird feeder 10 is further enhanced by the provision of a cap washer means 46, best viewed in FIG. 6, which preferably may be integrally molded with the support hook 21 and joined by a sprue-like connector portion during molding, generally referenced at 47. FIG. 7 is a cross-section taken along line 7—7 of FIG. 6 and shows the molded connection 47 between the cap washer means 46 and the support hook 21. The support hook 21 is detached from the cap washer means 46 by breaking connection 47, as would be clear. The cap washer means 46 is molded with a diameter about equal to, or slightly less than, the diameter of the bottle closure cap 16 whereby to be able to be inserted therein. A central opening 48 may be cut by the pointed end 33 of the piercing tool 32 or the creation of the opening 48 may be part of the molding and manufacturing procedure at the factory. Similarly, a hook support eyelet opening 49 may be made by the piercing tool 32 or during the molding and manufacturing procedure. The support hook 21 is preferably a plastic, such as G.P. polystyrene, as would of course, the cap washer means 46 molded therewith. The cap washer means 46, following the removal of the closure cap 16 from the threaded bottle neck, is placed inside the cap 16 and the line means 20 is inserted therethrough for connection thereto such as, for example, with a knot tied at the lower end. The line means 20 extends upwardly to be knotted, or otherwise secured, at the eyelet 49 for support of the feeder device 10 by the support hook 21. The purpose of the cap washer means 46 is mainly to rigidify the usually flimsy conventional closure cap 16, so that a sturdy, flat support reinforcing backet-like plate is provided by the cap washer means 46 as it underlies the cap 16.

With reference now made to FIG. 8, it will be seen that the umbrella-shaped cover member 17 is made in a pre-assembled flattened arrangement and formed whereby the person may bend it into the generally truncated cone-like shape shown in FIG. 1 for disposition stop the bottle 11. The cover member 17 is preferably made of a plastic, such as polystyrene, and includes a flat tangential side 50 as a part of the pre-assembled shape residing adjacent the central opening 18 prior to bending, which is also an edge of a flap portion 51 for underlapping meeting edges of the cover 17 when connected, as is clear in FIG. 1. Specifically, the flap 51 has a width defined by the length of side 50, and extends radially from edge 50 ultimately to be overlapped by an opposing, also radial, leading edge 52 when the cover 17 is bent into the conic shape. Slots 53 are cut-out through the flap 51 and are sized to receive tabs 54 formed with the edge 52 similarly to the structure of tabs 23 and slots 22 of sleeve 15. The tabs 54 also are provided with ears 55 which extend outwardly therefrom and terminate at narrower notches 56 adjacent the edge 52. Thereby, when the tabs 54 are inserted through the slots 53 the ears 55 pass through the slots 53 so that the tabs 54 are held securely within the notches 56, as would be clear. Thus, edge 52 is made to overlap the flap 51 and be radially arranged with respect to the central opening 18 when cover 17 is bent into the generally truncated, cone-like umbrella shape. The diameter of the opening 18 is preferably slightly less than the bottle cap 16 or otherwise sized to snugly surround the bottle neck, so that upon threading the closure cap 16 downwardly onto the neck of the bottle 11, the cover member 17 is pinched between the cap 16, and the bottle 11 to clamp the cover member 17 in place. The cover member 17 provides a rain barrier, keeping rain from soaking the seed in the trays 13. The umbrella-like cover member 17 also an impediment to squirrels, chipmunks, and the like, from stealing the seed from the feeder trays 13.

In order to easily replenish the supply of seed within the feeder 10, another flexible and bendable apparatus component is provided at a funnel 57, best viewed in FIG. 9. The funnel 57 also is flat prior to being assembled, and in the illustrated embodiment includes a handle 59 at one side and a plurality of slots 60 engagable by tabs 61 when the funnel 57 is bent into a three dimensional shape. The tabs 61 includes ears 62 and notches 63 similiar to the structure provided for the tabs and slots of sleeve 15 and cover member 17. An underlap strip portion 64, adjacent slots 60, is cooperatively arranged to be covered by an opposingly positioned edge 65, from which the tabs 61 project, when the sheet is bent into the funnel shape. A central generally semi-circular portion 66 forms the funnel spout, or opening, when the funnel 57 is bent and when the tabs 61 are engaged with the slots 60, as would be appreciated.

When funnel 57 is needed the closure cap 16 may be removed from the top of the bottle 11 and the funnel spout 66 placed thereat with the person conveniently holding the handle 54, so that bird seed may be simply poured therethrough into the bottle 11, without spilling, to re-supply the feeder 10 with seed.

In the preferred embodiment, the funnel 57 may be made of a clear polyethylene material. In the exemplary embodiment, the cover member 17 is made of green polystyrene. The feeder trays 13 are also desirably green to match and are preferably made of durable G. P. polystyrene. The support hook 21 may also be green to color-coordinate with the other green components and similiarly be made of G. P. polystyrene. The decorative sleeve 15 may be clear, or opaque, with or without other decorative markings, and may be colored, as desired, to coordinate with the color scheme selected for the feeder trays 13, cover member 17 and support hook 21, as would be understood.

Accordingly, a conversion method and apparatus therefor is provided for making the bird feeder 10 from a conventional beverage bottle 11 by virtue of the cooperative combination with the support hook 21, line means 20, cap washer means 46, feeder trays 13, decorative sleeve 15, umbrella cover 17, and the funnel 37 for refilling the feeder 10 when empty.

While there is no mandated sequence for the conversion method steps, it will be observed that the bottle 11 and sleeve 15 must necessarily be cut prior to the step of inserting the feeder trays 13, as would be understood. The sleeve 15 may have the H-shaped cut-outs pre-cut by the manufacturer; alternatively they may be marked by the consumer, or otherwise stamped or marked by the manufacturer on the sleeve 15. The piercing-and-cutting tool 32 may be used to make the H-shaped cut-outs 27 through the sleeve 15 at the same time as cutting the bottle sidewall 14 to create the flaps 30A and 31A. When the sleeve 15 has the H-shaped cut-outs 27 pre-cut, only the bottle sidewall is pierced and cut with the tool 32 while the sleeve 15 is placed around the bottle so to act as a cutting guide or template. Because the sleeve 15 preferably has the H-shaped cut-outs 27, and thereby has the inwardly bendable flaps 30 and 31, the sleeve 15 will be, of course, first assembled around the bottle 11 prior to insertion of the feeder trays 13 through the wall 14. Alternately, the sleeve 15 may be shorter and only extend to rest atop the trays 13. Thus, no H-shaped cut-outs in this alternate would be needed. The umbrella cover member 17, in preferred form, would be assembled following the removal of closure cap 16 and after the creation of the aperture 19 therethrough. The insertion of the cap washer means 46 under closure cap 16 can be made following the piercing of cap 16 to create the aperture 19. Next the connection of the line means can with the cap washer means 46 may be made and then the line means can be extended upwardly therethrough for attachment to support hook 21. Thereafter, the cap 16, with the cap washer means 46 therein, may be re-thread engaged with the bottle neck whereby to clamp the cover member 17 stop the bottle. For ease of assembly, it is anticipated that the cutting of the H-shaped cut-outs for receipt of the feeder trays 13 and the wrapping-around of the sleeve 15, would precede the attachment of the cover 17 and the assembly of the cap 16, line means 20, hook 21, and cap washer means 48. Of course, prior to re-securing the cap 16 back onto the bottle 11, bird seed will be fed into the bottle, preferably by use of the assembled funnel 57, as described.

In the example disclosed, it will be observed again that the feeder trays 13 are located in close proximity to the base 12 so that the base 12 in fact provides a bottom support rest against the trough bottom wall 41, as best viewed in FIG. 4. Since typical carbonated beverage bottles use a heavier, usually vinyl, plastic material for such bases, which is typically thicker than the sidewall, the feeder trays 13 may thus take advantage of this feature to be arranged thereon and thereby be given this additional sturdy support. Of course, it is usually best to place the trays 13 as low as possible in order that most of the bird seed is situated above them for filling with seed.

While no critical material requirement is made for the piercing-and-slitting tool 32, it is envisioned that a 22 gauge, cold rolled steel would satisfy the need for providing a sharp edge for cutting the plastic materials from which beverage bottles are conventionally made and for piercing the bottle closure caps.

Accordingly, the invention provides a method for converting a plastic bottle into a bird feeder and includes a set of conversion apparatus and components for use in such method whereby to make a unique bird feeder thereby. The bird feeder being formed by a an efficient combination of conversion kit apparatus for a plastic bottle, preferably a two-liter carbonated beverage container common to the industry. The components and method for the creation of the bird feeder 10 may be relatively, inexpensively made by known plastic molding techniques, in a clearly economical combination with beverage containers that are otherwise usually discarded by the consumer when empty. It will be seen that consumers can take great delight in making the inventive bird feeder at low cost in quick easy steps wherein several such bird feeders for different type seed and birds may be provided at a household for the enjoyment and recreation of the entire family.

What is claimed is:

1. A combination of apparatus components cooperative for converting a plastic bottle into a bird feeder for a bottle being of the type having a closed sidewall and open neck portion being thread-engageable by a closure cap, said combination comprising:

sleeve means adapted to fit around and cover a portion of the sidewall of a plastic bottle;

tool means capable of piercing and slitting the sidewall of a bottle to create at least one generally H-shaped cut-out slot through the sidewall;

a feeder tray means having an open trough-like portion and capable of being inserted into the at least one H-shaped cut-out slot to be held by the sidewall of a bottle thereat;

cover means formed to have a central opening and a conic-like umbrella shape whereby the central opening may receive therethrough the neck portion of the plastic bottle;

cap washer means capable of being inserted interiorly of a closure cap when a closure cap is thread engaged to the neck portion of a plastic bottle;

support hook means capable of supporting a plastic bottle filled with bird seed and, line means for supportively communicating at one end with said cap washer means through said closure cap and for connection at an other end to the support hook means whereby the support hook means may supportively communicate with the cap washer means and thereby be capable of supporting a bird feeder made by the combination of apparatus components for converting a plastic bottle.

2. The combination as claimed in claim 1 wherein said sleeve means is made of a bendable flat sheet of plastic having bendably opposable and overlappable edges and having slots adjacent one edge and tabs along the other edge, whereby said sheet is bendable into a cylindrical shape wherein said tabs are engageable with said slots to thereby secure the sleeve means in said cylindrical shape around the sidewall of a plastic bottle, and wherein the sleeve means is capable of being arranged around said bottle to cover a major portion of the sidewall thereof.

3. The combination as claimed in claim 2 wherein said sleeve means is sized whereby to be capable of being rested atop a base member affixed at the bottom of said plastic bottle, for a base member being of the type that is attached at the bottom of plastic bottles for the support thereof.

4. The combination as claimed in claim 1 wherein said sleeve means is formed with at least one H-shaped cut-out whereby upon arranging said sleeve means around a plastic bottle said at least one H-shaped cut-out is useful as a template means whereby the tool means may be used to piercingly follow the at least one H-shaped cut-out of the sleeve means and thereby correspondingly cut and pierce at least one H-shaped cut-out through a sidewall of a plastic bottle.

5. The combination as claimed in claim 1 wherein said cover means is made of a bendable flat plastic sheet having a curved outer edge and an engageable tab and slot means located at opposing edges generally radially extending and separating the curved outer edge, and said tab and slot means being capable of being connected to form a generally umbrella-shape for the cover means and wherein said central opening is provided to have a diameter equal to or less than the diameter of the bottle closure cap, whereby to be securably clamped by said bottle closure cap stop a plastic bottle when the closure cap is engaged to the thread engageable neck portion thereof.

6. The combination as claimed in claim 1 wherein said combination further includes a funnel means made of a flat bendable plastic sheet, having engageable tab and slot means, whereby to be capable of being bent into a generally funnel-like shape and secured in said shape by means of engaging said the tab and slot means whereupon the funnel means has a larger opening at one side and a smaller spout opening at the other, the smaller spout opening having an opening diameter equal to or less than the bottle neck portion opening for the filling therethrough of bird seed into the plastic bottle.

7. The combination as claimed in claim 1, wherein said feeder tray means further includes a ring means providing for both a handle-like function to enable the manual insertion of the feeder tray means through an H-shaped cut-out slot through a bottle sidewall and a perch for a bird to rest thereon while feeding.

8. The combination claimed in claim 7, wherein said feeder tray means further includes a vertical flange below the trough-like portion and the flange having a leading edge, said leading edge spaced below the trough-like portion whereby to supportably abut with the plastic bottle wherein about half of the trough-like portion extends interiorly of the bottle for receipt of seed and about the other half of the trough-like portion extends outwardly of the bottle for the accommodation of a bird to eat the seed therefrom.

9. The combination as claimed in claim 8 wherein the trough-like portion of said feeder tray means includes an angled and pointed front wall means which is first insertable through a said H-shaped cut-out slot, wherein upon insertion therethrough and at the abutment of said flange with said bottle, said angled front wall means provides a sloped downward flow path of bird seed from above inside the bottle into the trough-like portion.

10. The combination as claimed in claim 1 wherein said support hook means and cap washer means are integrally molded and joined by a sprue-like connection in the molding process, the connection having a thickness less than the thickness of the support hook means and cap washer means, wherein the connection may be severed whereby to enable said support hook means and cap washer means to serve their separate functions in said combination.

11. The combination as claimed in claim 1 wherein said tool means has a pointed leading cutting tip capable of piercing a metal thread engagable bottle closure cap for a plastic bottle, whereby the tool means is capable of piercing an aperture therethrough for the subsequent receipt therethrough of the line means.

12. A method of converting a plastic bottle into a bird feeder for the type of bottle having a threaded closure cap being engageable with a threaded open bottle neck portion, the bottle shape being defined by a curved bottle sidewall, said method comprising the steps of:
  A. securing a flexible sleeve member around the bottle sidewall to cover a major portion of the sidewall surface;
  B. piercing the bottle sidewall in at least one location to form a generally H-shaped cut-out having bendable flap portions;
  C. inserting a feeder tray member partially through the H-shaped cut-out whereby to bend the flap portions inwardly of the bottle;
  D. piercing the bottle cap whereby to provide an aperture therethrough and passing one end of a support line means through the aperture;
  E. attaching a support means to the support line means at the other end thereof;
  F. placing a cover means around said bottle neck portion through a central opening of said cover means, the cover means extending sufficiently outwardly from said bottle neck portion so that the cover means extends outwardly over said feeder tray member; and,
  G. thread-engaging said bottle closure cap onto said threaded bottle neck portion whereby to secure said cover means atop said bottle.

13. The method according to claim 12 wherein said piercing of the bottle sidewall further includes piercing the sleeve member to have at least one correspondingly positioned H-shaped cut-out therethrough.

14. The method according to claim 12 wherein said piercing of said at least one H-shaped cut-out includes following at least one H-shaped template like cut-out through the sleeve member and using said at least one H-shaped cut-out as a guide, whereby to pierce at least one correspondingly positioned H-shaped cut-out said through said bottle sidewall.

15. The method according to claim 12 wherein said step of securing a flexible sleeve member around said bottle sidewall includes the preliminary step of bending the sleeve member from a generally planar sheet of flexible plastic material into a generally cylindrical sleeve-like formation for placement around the bottle sidewall.

16. The method according to claim 12 wherein said step of placing a cover means at the central aperture thereof around said bottle neck portion includes the preliminary step of bending the cover means from a planar sheet of flexible plastic material having two opposing generally straight-overlapping edge portions having opposing tabs and slots, respectively, to form said sheet into a generally truncated, cone-like shape, and then engaging the tabs and slots for securement of the cover means in said shape.

17. The method according to claim 12 including the steps of inseting a cap washer means inside said bottle closure cap, said cap washer means having an aperture therethrough wherein said support line means may pass therethrough passing from the pierced aperture of said closure cap whereby to be supportively associated with said cap washer means at said one end thereof and to extend therefrom for said attachment at the other said end with said support means; and, whereby upon said step of thread-engaging the closure cap to the threaded bottle neck portion, the bird feeder may be supported at said cap washer means and said closure cap by the support means and support line means.

18. The method according to claim 12 wherein the piercing of the bottle sidewall to create an H-shaped cut-out includes forming generally parallel edges of the H-shape to be spaced apart at a distance equal to or less than indent means formed on the feeder tray member, whereby upon inserting the feeder tray member partially through said bottle sidewall, the edges of the sidewall resiliently press laterally against said indent means of said feeder tray member for added support thereof.

19. A bird feeder comprising, in combination:
a plastic bottle having a threaded open neck portion engageable by a threaded bottle closure cap having an aperture therethrough, a sidewall generally defining the bottle shape, a plurality of generally H-shaped cut-outs through the sidewall, and a base member attached generally around the bottom of the sidewall to provide a support stand for the bottle;
a plurality of feeder tray means extending through said H-shaped cut-outs, the feeder tray means having an upwardly open trough-like shape including a first portion thereof opening interiorly of the bottle and a second portion opening exteriorly of the bottle whereby to grant birds access to the seed from the outside of the bottle and wherein seed inside the bottle is capable of flowing into the feeder tray means at said first portion thereof;
sleeve means extending around said sidewall;
an umbrella-like cover member having a central aperture receiving therethrough the threaded neck portion at the bottle, wherein said bottle closure cap upon being thread engaged to said neck portion is capable of securing said cover member to said bottle;
support hook and line means for supporting said bird feeder, said line means supportively connected at one end thereof with said support hook means and having another end extending through said closure cap aperture; and,
cap washer means inside of said bottle closure cap and supportively engaged with the end of said line means extending through said closure cap aperture whereby to cooperate with the closure cap when thread engaged to said neck portion for the support of said bird feeder by said support hook and lines means.

20. The combination as in claim 19 wherein said sleeve means is opaque.

21. The combination as claimed in claim 19 wherein said sleeve means is translucent and has decorative indicia thereon.

22. The combination as in claim 19 wherein said first portion of said feeder tray means include a pointed forward-extending wall inserted through said H-shaped slots of said sidewall interiorly of said bottle, said feeder tray means further including a ring means formed with said exterior second portion at an end of the feeder tray means opposite said pointed forward-extending wall, said ring means arranged outwardly of said bottle whereby to provide a perch for feeding birds.

23. The combination as in claim 22 wherein said feeder tray means further include a flange means extending therebelow for less than the full length thereof and having an abutting leading edge for supportive abutment against the bottle whereby vertical force caused by a bird perching on the ring means is prevented from pivoting said feeder tray means out of engagement with said H-shaped cut-outs by means of said abutting leading edge stopped against said bottle whereby to prevent said pivoting.

24. The combination as in claim 19 wherein said sleeve means and cover member are formed from flexible flat plastic sheets and include tab and slot engaging means whereby they are bendable into their respective bottle-cooperative configurations and secured in said configurations upon the engagements of their respective tab and slot means.

25. The combination as in claim 19 when said plastic bottle is a carbonated beverage bottle with a threaded metal closure cap.

26. The combination as in claim 19 further including a separate funnel means bendable into a funnel shape from a flat sheet piece of flexible plastic material and having tab and slot engageable means capable of securing said flat sheet in the funnel shape having an open spout end sized to be equal to or less than the bottle neck portion opening and having an open larger receiving end, whereby the funnel means is capable of being disposed at the bottle neck portion opening upon removing said bottle closure cap therefrom in order to provide for the filling of the bird feeder with bird seed when required.

* * * * *